United States Patent [19]

Garrett

[11] 4,325,536
[45] Apr. 20, 1982

[54] BUTTERFLY VALVE WITH SELF LOCKING DISC

[76] Inventor: Arthur E. Garrett, Rte. 10, P.O. Box 204, Caldwell, Id.

[21] Appl. No.: 271,511

[22] Filed: Jun. 8, 1981

[51] Int. Cl.³ .............................................. F16K 1/22
[52] U.S. Cl. ................................................... 251/308
[58] Field of Search ................ 251/305, 308; 403/167, 403/344

[56] References Cited

U.S. PATENT DOCUMENTS

| 868,182 | 10/1907 | Hayden | 251/305 |
|---|---|---|---|
| 955,979 | 4/1910 | Murphy | 251/308 |
| 1,519,961 | 12/1924 | Ham | 251/308 |
| 1,794,581 | 3/1931 | Burdick | 251/308 |
| 2,105,343 | 1/1938 | Briggs | 251/308 |
| 2,114,168 | 4/1938 | Auger | 251/305 |
| 2,282,825 | 5/1942 | Puffer | 251/305 |
| 2,552,117 | 5/1951 | Roswell | 251/308 |
| 2,754,969 | 7/1956 | Petersen | 251/305 |
| 3,214,150 | 10/1965 | Rice | 251/308 |

FOREIGN PATENT DOCUMENTS

| 340149 | 3/1920 | Fed. Rep. of Germany | 251/308 |
|---|---|---|---|
| 682446 | 11/1952 | United Kingdom | 251/305 |
| 955502 | 4/1964 | United Kingdom | 251/305 |

Primary Examiner—H. Jay Spiegel
Attorney, Agent, or Firm—Paul F. Horton

[57] ABSTRACT

A self-locking butterfly valve adapted for placement in a tubular housing including a longitudinally slotted shaft with opposing grooves and a disc slideably received by the shaft. The disc is provided at one end with a slot engaging the grooves of the shaft and at the other end with a tab which, with the shaft, extends through an aperture in the housing for locking the disc to the shaft without use of external fasteners. A pin through the shaft may be used to prevent withdrawal of the shaft from the tubular housing.

4 Claims, 6 Drawing Figures

BUTTERFLY VALVE WITH SELF LOCKING DISC

BACKGROUND OF THE INVENTION

1. Field of the Invention

This invention relates, in general, to valves, and more particularly to butterfly valves which are self-locked into position.

2. Description of the Prior Art

Butterfly valves of many different shapes and for a multitude of purposes are well-known in the art. Generally, the valves comes as individual units including a tubular housing which is then connected to pipes or other apparatus. Valve discs may be supported by single shafts, C. H. Auger, U.S. Pat. No. 2,114,168, or by a pair of shafts or stems, S. R. Puffer, U.S. Pat. No. 2,282,825 and C. N. Roswell, U.S. Pat. No. 2,552,117. Discs are attached to the shaft by welding, or more commonly by screws, A. Petersen, U.S. Pat. No. 2,754,969. The problems associated with the installation of disc and shaft into an existing pipe and securing the disc to the shaft are obvious.

SUMMARY OF THE INVENTION

The present invention overcomes these difficulties by providing a valve for use with a hollow tube housing in which the valve consists of only two parts, a disc and a shaft, which are self-locking and wherein no fasteners for connecting disc to shaft are needed. A full description of the invention may be found in the appended claims.

It is therefore a general object of the present invention to provide a butterfly valve which may be inserted into an existing pipe which is easy and inexpensive to manufacture, which is easy to install, and which may be installed without external fasteners.

More particularly, it is an object of the present invention to provide a butterfly valve which is useable with an existing pipe and which includes only two interlocking parts.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
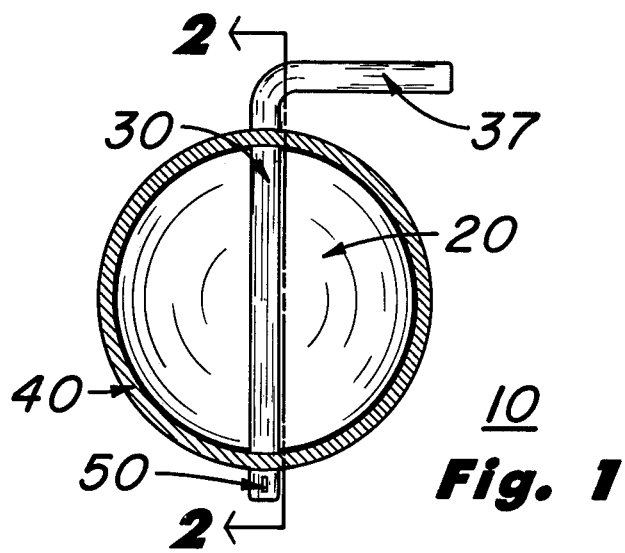
FIG. 1 is an end view of a valve embodying the present invention.
Figure 2:
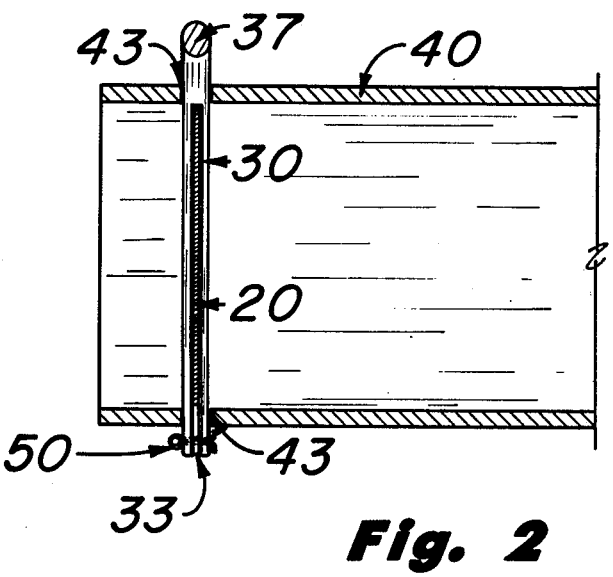
FIG. 2 is a sectional side view of the valve of FIG. 1.

Referring now to the drawings, and to FIGS. 1 through 4 in particular, an embodiment to be preferred of a butterfly valve 10 made according to the present invention is disclosed. Valve 10 includes a disc 20 and a shaft 30 mounted into a tubular housing 40.

Figure 4:
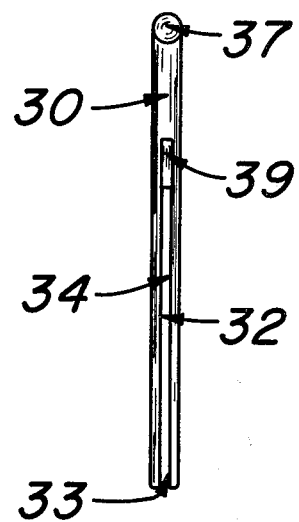
FIG. 4 is a frontal view of the valve shaft.

Shaft 30, as shown in FIG. 4, includes a longitudinal slot 33 extending from one end of the shaft, hereafter referred to as the open end, for a selected distance, depending upon the size and shape of disc 20, which, in turn, depends upon the size and shape of the interior dimensions of the tubular housing 40. Slot 33 is preferably a planar cut along the longitudinal axis of the preferably cylindrical, rectilinear, shaft. The planar cut defines two opposing planar facing surfaces in the shaft, designated by the numerals 32 and 34. The slot terminates at which is hereinafter referred to as the closed end of the shaft.

Shaft 30 is also provided at its closed end with a pair of oppositely disposed grooves 39 in alignment with slot 33 and continuing as extensions of the slot. Shaft 30 is provided at its terminal closed end with a handle 37 which may be ingtegral with or separable from the shaft. A simple right angle bend in the shaft itself may serve, where desired, as a handle.

Disc 20, in the preferred embodiment, is flat, having planar opposing sides, but may be of any selected shape depending upon the shape of the tube interior into which it is to be placed and depending upon the angle of closure within the tube. Disc 20 is provided with a tubular projection 22 and an aligned slot 28, which, in cooperation with the slotted shaft are the critical elements of this invention. Slot 28 defines a pair of opposing ears 27 and 29 which, when disc 20 is inserted into slot 33 of the shaft, are received by opposing grooves 39 to hold the disc in firm engagement with the closed end of the shaft.

Figure 3:
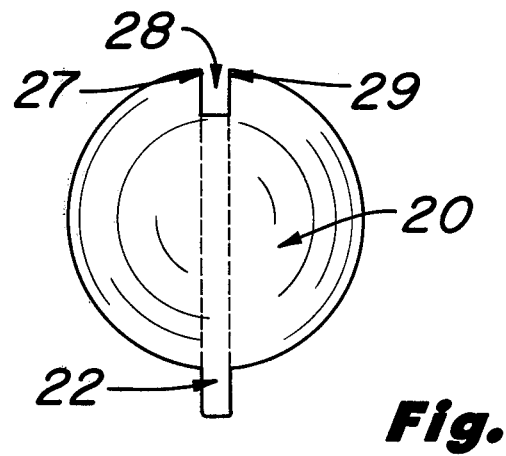
FIG. 3 is a plan view of the valve disc.

The central portion of the disc, when inserted into the slot of the shaft, in the area defined by the dotted lines in FIG. 3, contacts the planar facing surfaces 32 and 34 of the slot and tab 22, which is substantially equal in width to the shaft, terminates adjacent the open end of the shaft. When disc and shaft are incorporated into a tubular housing to form a butterfly valve, it will be seen that tab 22 extends through the wall of the housing and the disc is thereby prevented from lateral movement as the sides of the tab and shaft engage the walls of the shaft receiving aperture 43 of the housing. If desired, a pin 50, insertable through appropriately bored openings of the open end of the shaft may prevent the shaft from being removed from the tubular housing. It will be understood that shafts having varying shapes of slots, as for example a curved or V-shaped slot, could readily be used in the invention, it only being essential that the disc body and the tab be complementary with the slot.

Figure 5:
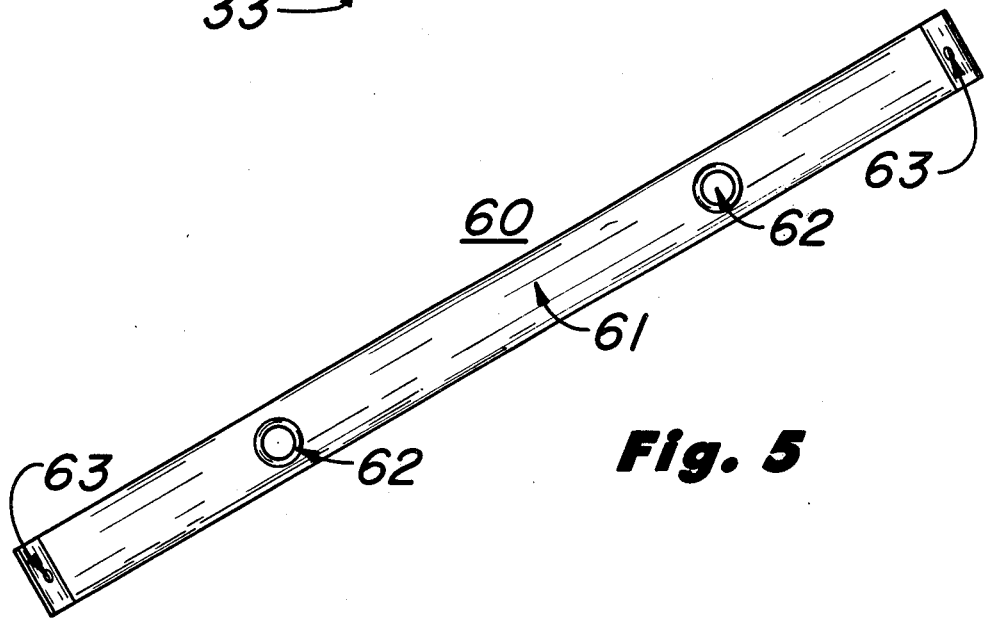
FIG. 5 is a plan view of a template used with the valve.
Figure 6:
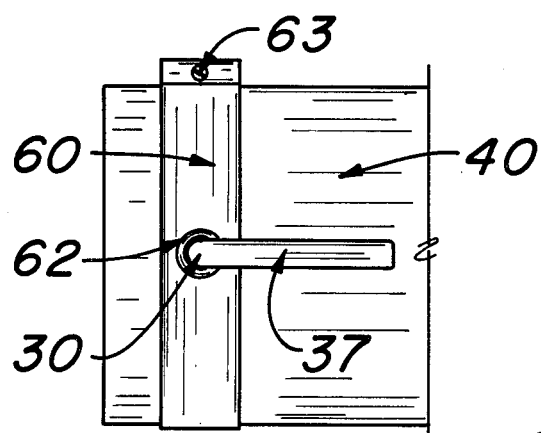
FIG. 6 is a plan view of the valve with the template in place.

In setting the valve up for operation, it will first be determined what size and shape of tubing is to be used for the housing. The internal dimensions of tubular housing 40 are then ascertained and disc 40 cut to size depending upon closure angle. If a cylindrical housing is used, as shown in FIG. 1, and the closure angle is 90° to the longitudinal axis of the housing, the disc will approximate the cross-sectional area of the housing. A shaft of appropriate dimensions is then provided with slot 33 and grooves 39 and a pair of oppositely disposed and aligned shaft openings 43 are drilled through the housing 40, preferably by using a suitable template 60 as shown in FIG. 5. Template 60 may be in the form of a metallic band 61 provided with bushing 62 and coupling means 63 in the manner of a threaded aperture with screw. The template, while useful, is not essential to the invention. After openings 43 have been drilled and the template, if desired, is in place, the disc is placed into the tubular opening of housing 40 and shaft 30 is pushed through one of the shaft openings 43 of the housing and is slipped over disc 20 with slot 33 of the shaft slidingly engaging the body of the disc until ears 27 and 29 of the disc engage grooves 39 of the disc. Simultaneously, tab 22 of the disc, within slot 33 of the shaft, and the open end of the shaft are pushed through the opposing shaft opening 43 of tubular housing 40. In this manner, it will be seen that the disc is held in place without other fasteners and the disc may be rotated to a closed or open position within the valve housing by simply rotating the shaft. The shaft may be held from withdrawing from the housing by its own weight, by parts external to the valve, or by means of pin 50. Where a template with bushings are used, the template may be held in place by a screw and threaded aperture 63, as shown in FIG. 6. Should a fluid-type valve be desired, the interior of the tubular housing may be provided with a valve seat, as is customary.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A butterfly valve comprising:
   a tubular housing having a pair of oppositely disposed apertures;
   a shaft provided with a longitudinal slot opening at one end of said shaft and extending a preselected length to define a closed end of said shaft; said shaft further provided with a pair of oppositely disposed grooves continuous with and in alignment with the slot; said shaft adapted for placement through the apertures of said housing; and
   a disc having a slot contact portion adapted for slidable reception in the slot of said shaft; said disc having a notch of predetermined length on one end, the notch defining a pair of ears; and said disc having a tab projecting a predetermined length on an opposing end, the ears operable to slidingly engage respective grooves of said shaft and said tab adapted to engage the interior walls defined by the slot of said shaft and to be held in alignment therewith.

2. The valve as described in claim 1 wherein the slot of said shaft is provided with opposing planar facing surfaces and wherein the slot contact portion of said disc has planar opposing surfaces, each of the surfaces of the contact portion of said disc adapted to engage a respective facing surface of the slot of said shaft.

3. The valve as described in claim 1 wherein the configuration of said disc conforms with the internal configuration of said tubular housing to substantially seal the tubular housing when said disc is rotated to a closed position.

4. The valve as described in claim 1 further comprising means for holding said shaft in rotatable engagement with said tubular housing.

* * * * *